J. C. FORD.
SEED THRESHING AND COLLECTING MACHINE.
APPLICATION FILED MAR. 22, 1919.

1,380,470.

Patented June 7, 1921.
4 SHEETS—SHEET 1.

Julius C. Ford.
Inventor

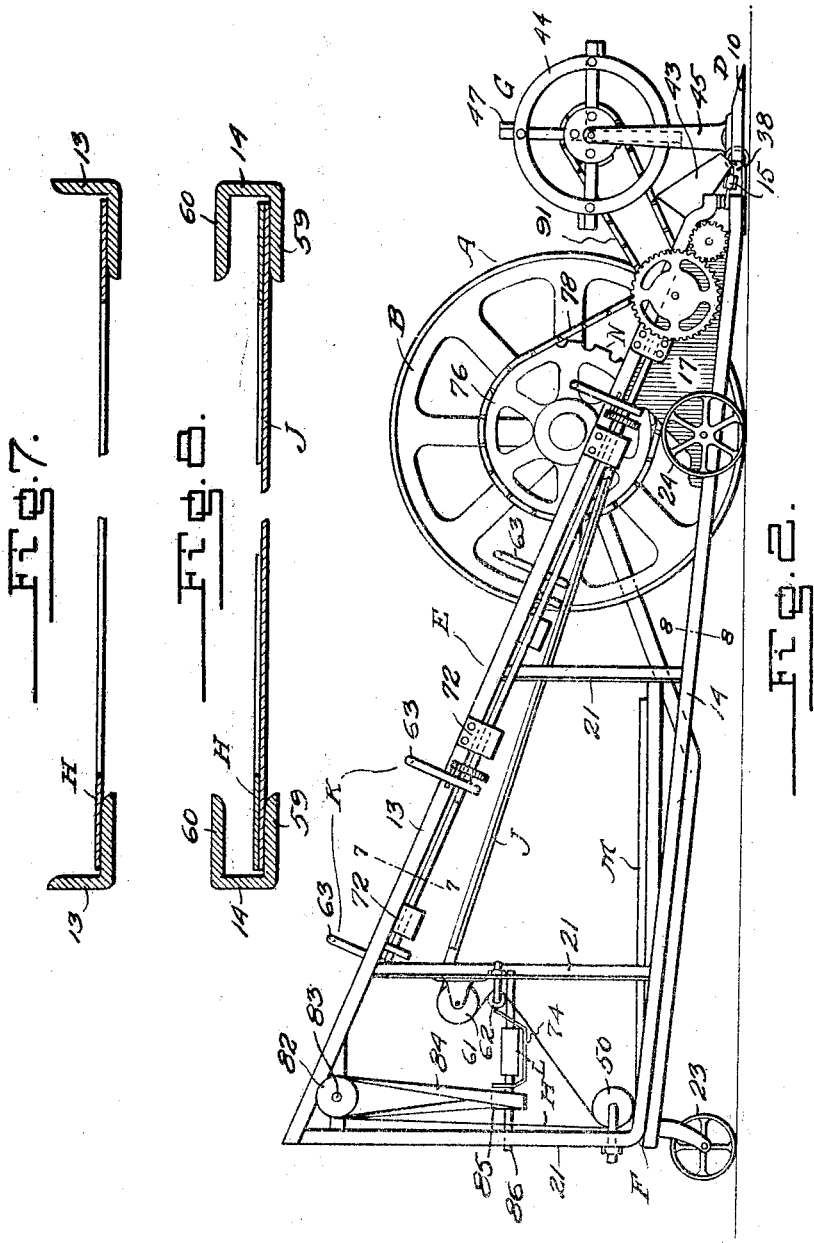

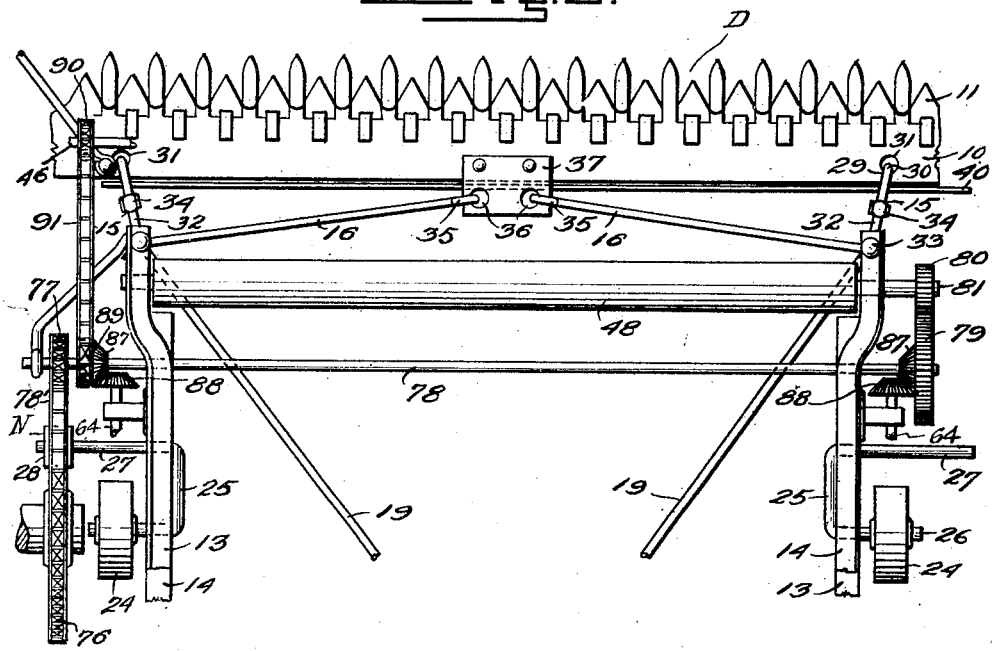
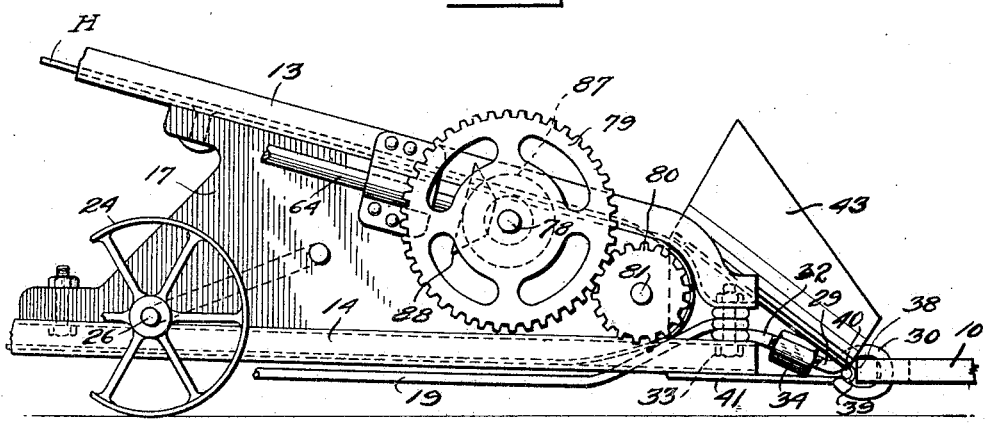

J. C. FORD.
SEED THRESHING AND COLLECTING MACHINE.
APPLICATION FILED MAR. 22, 1919.
1,380,470.
Patented June 7, 1921.
4 SHEETS—SHEET 4.
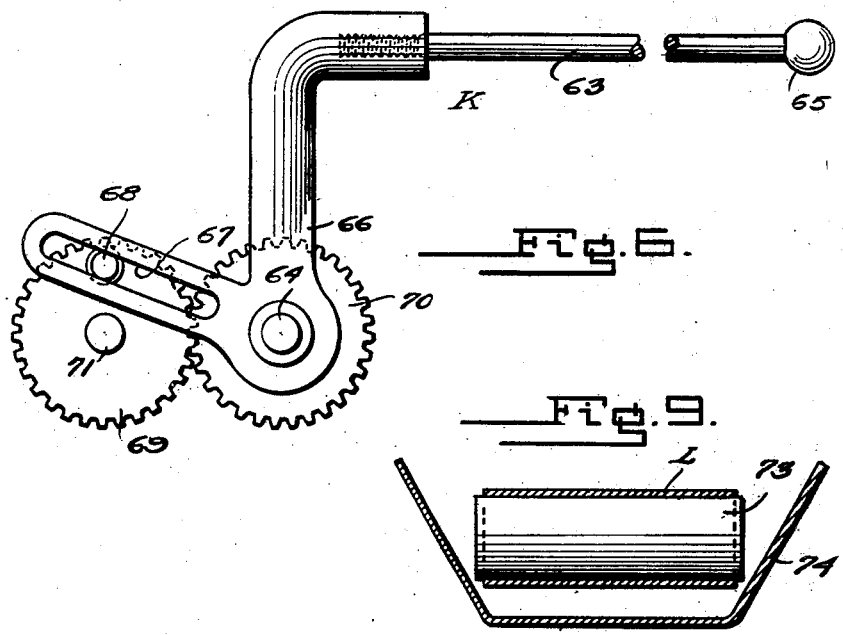
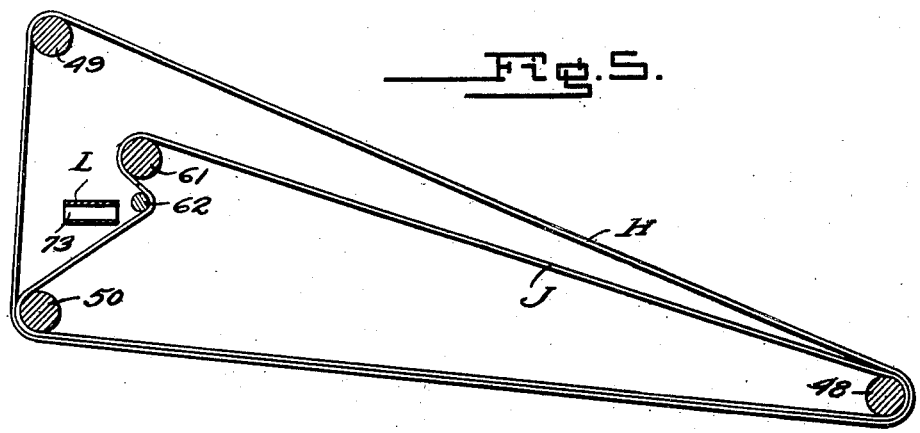
Julius C. Ford
Inventor
By Lancaster and Allwine
Attorneys

UNITED STATES PATENT OFFICE.

JULIUS C. FORD, OF SUMMIT, MISSISSIPPI.

SEED THRESHING AND COLLECTING MACHINE.

1,380,470.  Specification of Letters Patent.  Patented June 7, 1921.

Application filed March 22, 1919. Serial No. 284,398.

*To all whom it may concern:*

Be it known that I, JULIUS C. FORD, a citizen of the United States, residing at Summit, in the county of Pike and State of Mississippi, have invented certain new and useful Improvements in Seed Threshing and Collecting Machines, of which the following is a specification.

My present invention relates to machines for threshing and collecting seeds or grains from straw or plant growths directly after they are mowed and before the gavels are dropped to the ground. While the invention as herein disclosed is a machine particularly adapted for attachment for an ordinary mowing machine and to be advanced therewith over the field, it is to be understood that the substance of this invention may be embodied as a permanent part, so to speak, of a machine for mowing the plant growth and threshing and collecting the seed therefrom before the gavels are dropped in the rear of the machine.

The principal object of my invention is to provide a machine which will thresh and collect from the plant growths a maximum amount of seed or grains leaving little if any of such to fall to the ground during harvesting. While the machine is particularly well adapted to harvest what is commonly known as Japanese clover seed which is particularly light in weight and which will not readily sift through a batch of straw or plant growth, the machine may well be used in the harvesting of any seed which may be threshed from the straw or plant growth directly after having been mowed.

Other objects of my invention are to provide a machine which may be readily attached to mowing machines now in common use and which is comparatively light in weight so as to not require the use of a great number of draft animals; a machine which may be operated from one of the ground wheels of the mowing machine in such a way as to reduce the liability of skidding to a minimum; and a machine so connected to and operated from the mowing machine as to prevent the machine from swaying laterally or becoming out of alinement with the mowing machine during normal use.

Other objects and advantages of the invention will appear in the following detailed description, taken in connection with the accompanying drawings, forming a part of this specification, and in which drawings:—

Fig. 2 is a side elevation of the same.

Fig. 3 is an enlarged detail plan view of the front portion of the machine showing its relation to the cutting mechanism of the mowing machine, and parts being removed to disclose details.

Fig. 4 is a similar view in side elevation.

Fig. 5 is a diagrammatic view showing the relative position of conveyers and their drums.

Fig. 6 is a detail view in elevation showing means for operating rods for threshing out the seed or grain.

Fig. 7 is a transverse sectional view through a portion of the machine on the line 7—7 of Fig. 2.

Fig. 8 is a similar view on the line 8—8 of Fig. 2.

Fig. 9 is an enlarged transverse sectional view through a conveyer and trough for the seed or grain.

Figure 1:
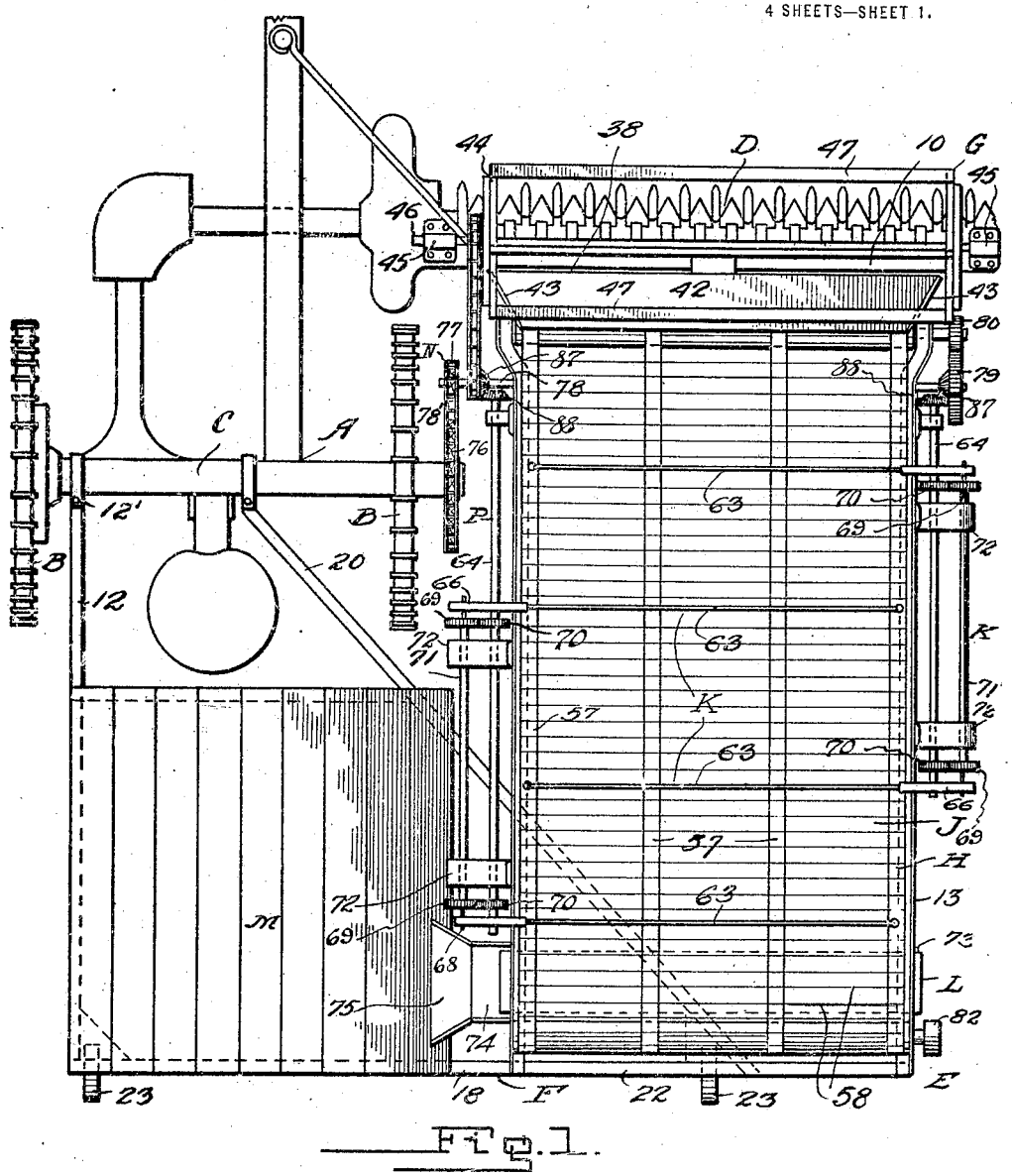
Figure 1 is a top plan view of the machine attached to an ordinary mowing machine.

In the drawings where similar characters refer to similar parts throughout the several views, A designates generally a mowing shape including the ground wheels B, main frame C supporting the usual mechanical movements, and cutting apparatus D; and E designates generally the threshing and collecting machine comprising generally a frame F connected to the frame C and cutting apparatus D as hereinafter described; means G for pressing the plant growth to the cutting apparatus D and causing the plant growth to fall upon a sieve-like inclined endless conveyer H, the upper run of which endless conveyer H travels upwardly and rearwardly from the cutting apparatus D; an endless conveyer J, the upper run of which is beneath the upper run of the conveyer H; threshing mechanism K operating above the upper run of conveyer H; a transverse conveyer L adjacent the delivery end of conveyer J adapted to deliver seeds or grains to adjacent a platform M supported by frame F; transmission N for operating the conveyers H, J and L from one of the ground wheels B of the mowing machine, and transmission P for operating the threshing mechanism K.

As hereinbefore set forth, in the present example, the threshing and collecting machine is applied to an ordinary mowing machine including the usual finger or cutter bar 10 and reciprocating scythe 11.

The frame F of the threshing and collecting machine may comprise a longitudinally extending member 12, connected to the frame C as at 12'; upper and lower longitudinally extending frame members 13 and 14, in pairs, laterally of the frame of the mowing machine, connected to the cutter bar 10 as by take-up couplings 15 and braces 16; upright bearing plate 17 joining the frame members 13 and 14 at their forward ends; rear transverse frame member 18 joining the frame members 12 and 14; suitable transverse diagonally extending bars 19 and 20 extending crosswise from the front of the frame members to the rear thereof, and suitable uprights 21 and transverse members 22 for holding the frame members 13 and 14 in the desired space relation. The frame F is also supported, at its rear end by suitable caster wheels 23, and its forward end adjacent the cutting apparatus D by ground wheels 24, which, in the present example are shown supported by the bearing plate 17 as through a U-shaped member 25 one stem 26 of which supports the wheel 24, while the other stem 27 of which may be used, as clearly shown in Fig. 3 of the drawings, to support an idler 28 for the purpose to be more fully set forth hereinafter.

The take-up couplings 15 may consist of a member 29 having a hook end portion 30 extending through an aperture 31 in the cutter bar 10; a member 32, connected with frame F as by bolts 33 extending through the forward ends of frame members 13 and 14; and a nut 34 having an oppositely screw-threaded bore acting in a manner similar to a turn buckle for adjusting the relative position of the forward end of machine E with respect to mowing machine A. The braces 16 may also be connected with the machine E as by bolts 33, their forward ends being hooked as at 35 and extending through perforations 36 in the plate 37, riveted or otherwise secured to the cutter bar. The take-up couplings 15 are particularly well adapted to adjust the entire threshing and collecting mechanism with respect to the mowing machine A and quick adjustment may be accomplished by rotating the nuts 34 in one direction or the other so as to draw the members 29 and 32 of each take-up coupling either toward or from one another.

The frame F may also support a plate 38, V-shaped in cross section with its apex 39 supported by a bar 40 forwardly of the machine E, one wing 41 being secured to the under side of the frame members 14 and extending between the frame members, while the other wing 42 is inclined rearwardly and upwardly to guide the plant growth toward the upper run of conveyer H. This plate 38 may be provided with upright wings 43, to also guide the plant growth laterally to the upper run of conveyer H when said conveyer is relatively narrower than the cutting apparatus D.

The means G for pressing the plant growth to the cutting apparatus D and causing it to fall upon the endless conveyer H may consist of the usual revolving reel 44 supported as by bearings 45 secured to the cutter bar 10 and shaft 46, the bars 47 of the reel being adapted to urge the plant growth toward the cutting apparatus D as the machine is advanced in the well-known manner. It is preferred to dispose this reel 44 in such a position that it will not only aid in severing the growth from the stubble, but also cause it to move upwardly on the wing 42 of plate 38 onto the conveyer H.

The sieve-like endless conveyer H travels about the drum 48 at the forward end of the machine E, a portion of the conveyer J being interposed between conveyer H and drum 48 as clearly shown in Fig. 5 of the drawings, and at the rear end of the machine, conveyer H travels about drums 49 and 50, the former being located relatively higher than the plane common to the axis of rotation of drums 48 and 50, so that the upper run of conveyer H is inclined upwardly and rearwardly of the machine. This conveyer H may consist of a plurality of endless flexible strips 57, trained about the drums 48, 49 and 50, and supporting a plurality of rods or wires 58 upon which the plant growth after having been severed from the stubble, rests in its travel toward the rear of the machine. It is preferred to form the upper frame member 13 of angle section as clearly shown in Fig. 7 of the drawings, so that the upper run of conveyers 8 may rest upon a ledge-like portion of frame member 13, and it is preferred to provide the frame members 14 of channel sections, as clearly shown in Fig. 8 of the drawings, so that the lower runs of conveyers H and J may travel between the parallel portions 59 and 60 of the frame members 14, resting upon the portions 59. The conveyer H is made sieve-like so that seed from the plant growth may drop freely therethrough upon the conveyer J.

The conveyer J is endless and imperforate, that is, of such a nature as to prevent the passage of seed therethrough and is also trained about the drums 48 and 50 as clearly shown in Fig. 5 of the drawings, and also trained about a drum 61 in a plane relatively higher than the plane of drum 48, this drum 61 being at the rear end portion of the machine E so as to support the upper run of the conveyer J in an inclined position upwardly and rearwardly of the machine. It is preferred to dispose a small drum 62 below drum 61 so as to train the conveyer J for a short distance toward the front of the machine, in order to provide the desired delivery end for conveyer J. It is to be observed that both conveyers H and J may be moved by power transmitted to drum 48 inasmuch as these conveyers are in frictional contact as clearly shown in Fig. 5 of the drawings.

The threshing mechanism K may consist of a plurality of rods 63 extending above and transversely of the conveyer H adapted to beat the straw or material as it passes upwardly on said conveyer. It is preferred to arrange these rods so as to swing about an axis, such as shaft 64 forming a part of transmission P hereinafter more fully described, in the present example these rods having at their free ends balls 65 to prevent injury to the conveyer. As clearly shown in Fig. 6 of the drawing, these rods may be supported by bell crank levers 66, the rods being in screw-threaded engagement with one portion of the lever, the other portion being slotted as at 67, through which extends a pin 68 extending laterally of a gear 69, which gear is in meshing relation with a gear 70 on shaft 64. Hence, rotation of gear 69 will operate the lever 66 about its axis, causing the rod 63 to move up and down, beating the straw. It is also preferred to alternate the pivotal connection of these rods, at opposite sides of the conveyer H. It is also preferred to connect gears 69 by a shaft 71, as clearly shown in Fig. 1 of the drawings, these shafts 64 and 71 being supported by bearings 72 secured to the frame members 13.

The transverse conveyer L may be of endless belt formation, being imperforate, or in other words, of that nature to prevent passage of seed therethrough, and is trained about rollers 73, it being preferred to provide a trough 74 beneath the conveyer L, this trough leading from adjacent one end of the conveyer beyond the other end thereof, so that the outlet 75 is above the platform M as clearly shown in Fig. 1 of the drawings. This conveyer L together with the trough is disposed at the delivery end of conveyer J and set inwardly beneath drum 61, so that not only that grain or seed which falls from conveyer J due to the force of gravity, but also that which may be blown therefrom will be collected and delivered above platform M.

As to transmission N it may consist of a sprocket wheel 76 operatively connected with ground wheels B nearest the cutting apparatus D, so as to rotate with said ground wheel; a sprocket wheel 77 secured to shaft 78 having bearings in plates 17; a chain 78' trained about sprocket wheels 76 and 77; a gear 79 secured to shaft 78 at the opposite side of machine E from machine A, a gear 80 secured to shaft 81 of drum 48, said shaft 81 having bearings also in plates 17, this mechanism being of such a nature as to cause conveyers H and J to travel fast enough, according to the speed of travel of the mowing machine A so that the machine E will not choke but rapidly convey the straw upwardly beneath the threshing mechanism.

The conveyer L may be moved by the provision of a pulley 82 on the shaft 83 of drum 49, about which pulley is trained a belt 84, also trained about a pulley 85 on shaft 86 of drum 73.

Transmission P in addition to including the shafts 64 and 71 together with gears 69 and 70 may comprise bevel gears 87 secured to shaft 78 and bevel gears 88 secured to the shaft 64, these gears 87 and 88 being in meshing relation so as to impart movement from one to the other.

The reel 44 may be rotated in the desired direction as by sprocket 89 secured to shafts 78 and sprocket 90 secured to shafts 46, a chain 91 being trained about sprockets 89 and 90.

While it is believed that the operation of the machine will be readily understood from the foregoing description, briefly, as the machine is advanced over the field and the plant growth urged toward the cutting apparatus and conveyer, it is cut in the well known manner and caused to travel upwardly and rearwardly of the machine, during which travel it is subjected to the beating action of the rods 63. The forward end of conveyer J is sufficiently near the reel 44 so as to collect any seed which may be knocked from the plant growth when engaged by the bars 47 of the reel.

The platform M will accommodate an operator who may sack the seed as it issues from the trough 74. The idler 28 may be used to maintain the chain 78 into operative relation to the sprockets 76 and 77 if there is considerable relative vertical movement of one machine with respect to the other.

I claim:

1. In a seed harvesting machine, the combination, of cutting apparatus adapted to be advanced over the field and sever the plant growth from the stubble, a sieve-like conveyer in close proximity to and at the rear of said cutting apparatus upon which the severed plant growths fall for supporting and conveying the plant growths from the cutting apparatus, and a conveyer beneath said sieve-like conveyer and in close proximity to said cutting apparatus for supporting and conveying seed which passes through said sieve-like conveyer from adjacent said cutting apparatus.

2. In a seed harvesting machine, the combination, of cutting apparatus adapted to be advanced over the field and sever the plant growths from the stubble, a sieve-like conveyer in close proximity to and at the rear of said cutting apparatus upon which the severed plant growths fall, for supporting and conveying the plant growths from the cutting apparatus, a conveyer beneath said sieve-like conveyer and in close proximity to said cutting apparatus for supporting and conveying seed which passes through said sieve-like conveyer from adjacent said cutting apparatus, and means forcing the plant growths head first toward said conveyers.

3. In a seed harvestng machine, the combination, of cutting apparatus adapted to be advanced over the field and sever the plant growths from the stubble, a sieve-like conveyer in close proximity to and at the rear of said cutting apparatus upon which the severed plant growths fall, for supporting and conveying the plant growths from the cutting apparatus, a conveyer beneath said sieve-like conveyer and in close proximity to said cutting apparatus for supporting and conveying seed which passes through said sieve-like conveyer from adjacent said cutting apparatus, and threshing mechanism acting upon the plant growth in its passage on said sieve-like conveyer.

4. In a seed harvesting machine, the combination, of cutting apparatus adapted to be advanced over the field and sever the plant growths from the stubble, an endless sieve-like conveyer extending rearwardly of said cutting apparatus and longitudinally in the path of travel of the machine and having upper and lower runs, the former for supporting and conveying the plant growths from the cutting apparatus, and an endless seed conveyer disposed between the upper and lower runs of said sieve-like conveyer, the upper run of said seed conveyer conveying the seed which passes through the sieve-like conveyer from adjacent said cutting mechanism.

5. In a seed harvesting machine, the combination, of cutting apparatus adapted to be advanced over the field and sever the plant growths from the stubble, an endless sieve-like conveyer extending rearwardly of said cutting apparatus longitudinally in the path of travel of the machine and having upper and lower runs, the former adapted to support and convey the plant growths from the cutting apparatus and a conveyer for the seed extending beneath the upper run of said sieve-like conveyer.

6. In a seed harvesting machine, the combination of cutting apparatus adapted to be advanced over the field and sever the plant growths from the stubble, a sieve-like member in close proximity to and at the rear of said cutting apparatus upon which the severed plant growths fall, and an endless seed conveyer disposed below said sieve like member adapted to support and convey seed which passes therethrough from adjacent said cutting apparatus.

7. In a seed harvesting machine, the combination of cutting apparatus adapted to be advanced over the field and to sever the plant growths from the stubble, an endless sieve-like conveyer extending rearwardly of said cutting apparatus longitudinally in the path of travel of the machine and having upper and lower runs, the former for supporting and conveying the plant growths from the cutting apparatus, an endless seed conveyer disposed between the upper and lower runs of said sieve-like conveyer, the upper run of said seed conveyer for conveying the seed which passes through said sieve-like conveyer from adjacent said cutting apparatus, and a transversely extending conveyer at the delivery end of said seed conveyer.

8. In a seed harvesting machine, the combination of cutting apparatus adapted to be advanced over the field for severing plant growths from the stubble, an endless sieve-like conveyer extending rearwardly of said cutting apparatus longitudinally in the path of travel of the machine and having upper and lower runs, the former for supporting and conveying the plant growths from the cutting apparatus, an endless seed conveyer disposed between the upper and lower runs of said sieve-like conveyer, the upper run of said seed conveyer being retroverted at its portion remote from said cutting apparatus to provide a delivery end beneath the upper run of said sieve-like conveyer, and a conveyer extending beneath the retroverted portion of said seed conveyer and the upper run of said sieve-like conveyer, to convey the seed laterally of said first two mentioned conveyers.

9. In a seed harvesting machine, the combination with a mowing machine including a ground wheel and cutting apparatus, of a frame connected to said mowing machine to be advanced therewith and extending rearwardly of said cutting apparatus laterally of said ground wheel, a drum carried by said frame extending longitudinally of said cutting apparatus in advance of the axis of said ground wheel, endless sieve-like and seed conveyers trained about said drum and extending rearwardly of and supported by said frame, the upper run of said sieve-like conveyer adapted to support and convey plant growths from said cutting apparatus and the upper run of said seed conveyer to support and convey seed passing through said sieve-like conveyer, and means for transmitting movement of said ground wheels to said drum.

10. In a seed harvesting machine, the combination of cutting apparatus adapted to be advanced over the field and to sever the plant growths from the stubble, an endless sieve-like conveyer extending rearwardly of said cutting apparatus longitudinally in the path of travel of the machine and having upper and lower runs, the former for supporting and conveying the plant growths from the cutting apparatus, an endless seed conveyer disposed between the upper and lower runs of said sieve-like conveyer, the upper run of said seed conveyer being retroverted at its portion remote from said cutting apparatus to provide a delivery end beneath the upper run of said sieve-like conveyer, and a trough extending beneath the retroverted portion of said seed conveyer and the upper run of said sieve-like conveyer, to convey the seed laterally of said first two mentioned conveyers.

11. In a seed harvesting machine, the combination of cutting apparatus adapted to sever the plant growth from the stubble, a sieve-like conveyer in close proximity to and at the rear of said cutting apparatus upon which the severed plant growths fall, for supporting and conveying the plant growths from the cutting apparatus, a conveyer beneath said sieve-like conveyer and in close proximity to said cutting apparatus for supporting and conveying the seed which passes through said sieve-like conveyer from adjacent the cutting apparatus, a plurality of rods pivotally mounted laterally of said first-mentioned conveyer, and positioned to extend thereover, and means for operating said rods to beat the plant growths during movement on said sieve-like conveyer.

12. In a seed harvesting machine, the combination with a mowing machine including a ground wheel and cutting apparatus, of a frame connected to said mowing machine to be advanced therewith and extending rearwardly of said cutting apparatus laterally of said ground wheel, a drum carried by said frame extending longitudinally of said cutting apparatus in advance of the axis of said ground wheel, endless sieve-like and seed conveyers trained about said drum and extending rearwardly of and supported by said frame, the upper run of said sieve-like conveyer for supporting and conveying plant growths from said cutting apparatus and the upper run of said seed conveyer to support and convey seed passing through said sieve-like conveyer, and speed increasing gearing between said ground wheel and said drum for imparting movement of said ground wheel to said drum at a higher rate of speed.

13. In a seed harvesting machine, the combination with a mowing machine, including a ground wheel and cutting apparatus, of a wheel supporting frame disposed to extend laterally of said ground wheel and rearwardly of said cutting apparatus, adjustable couplings pivotally connecting said frame to said cutting apparatus, endless sieve-like and seed conveyers supported by said frame and extending rearwardly of said cutting apparatus, the upper run of said sieve-like conveyer for supporting and conveying plant growths from said cutting apparatus and the upper run of the seed conveyer to support and convey seed passing through said sieve-like conveyer and means for transmitting movement of said ground wheels to said endless conveyers.

14. In a seed harvesting machine, the combination of cutting apparatus adapted to be advanced over the field and sever the plant growths from the stubble, a frame movable with and extending rearwardly of said cutting apparatus, a horizontal drum carried by said frame adjacent said cutting apparatus, a horizontal drum at the rear end of said frame parallel with the first-mentioned drum, two endless conveyers trained about said drums in frictional contact, the outermost of said conveyers of sieve-like formation and the innermost adapted to support seeds, drums for maintaining the upper runs of said conveyers separated and means for imparting rotation to said drums.

15. In a seed harvesting machine, the combination with a mowing machine including a ground wheel and cutting apparatus, of a frame connected to said mowing machine, to be advanced therewith and extending rearwardly of said cutting apparatus, endless sieve-like and seed conveyers carried by said frame and extending rearwardly of said cutting apparatus, the upper run of said sieve-like conveyer for supporting and conveying plant growths from said cutting apparatus and the upper run of said seed conveyer to support and convey seed passing through said sieve-like conveyer, threshing mechanism above said upper run of said sieve-like conveyer and transmission mechanism for operating said conveyer and threshing mechanism from the said ground wheel of said mowing machine.

16. In a seed harvesting machine, the combination with a mowing machine including a ground wheel and cutting apparatus, of a frame connected to said mowing machine to be advanced therewith and extending rearwardly of said cutting apparatus laterally of said ground wheel, endless sieve-like and seed conveyers carried by said frame and extending rearwardly of said cutting apparatus, the upper run of said sieve-like conveyer for supporting and conveying plant growths from said cutting apparatus, and the upper run of said seed conveyer to support and convey seed passing through said sieve-like conveyer, means forcing the plant growths head first toward said conveyers, and transmission mechanism for operating said conveyers and last-mentioned means from the said ground wheel of said mowing machine.

In testimony whereof I have hereunto affixed my signature.

JULIUS C. FORD.